No. 805,145. PATENTED NOV. 21, 1905.
M. D. LEWIS.
LANTERN BRACKET.
APPLICATION FILED FEB. 6, 1905.
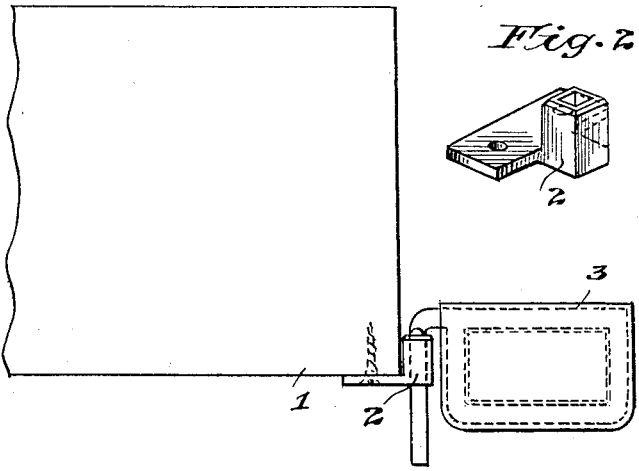
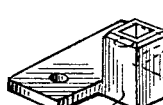
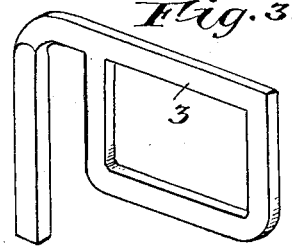
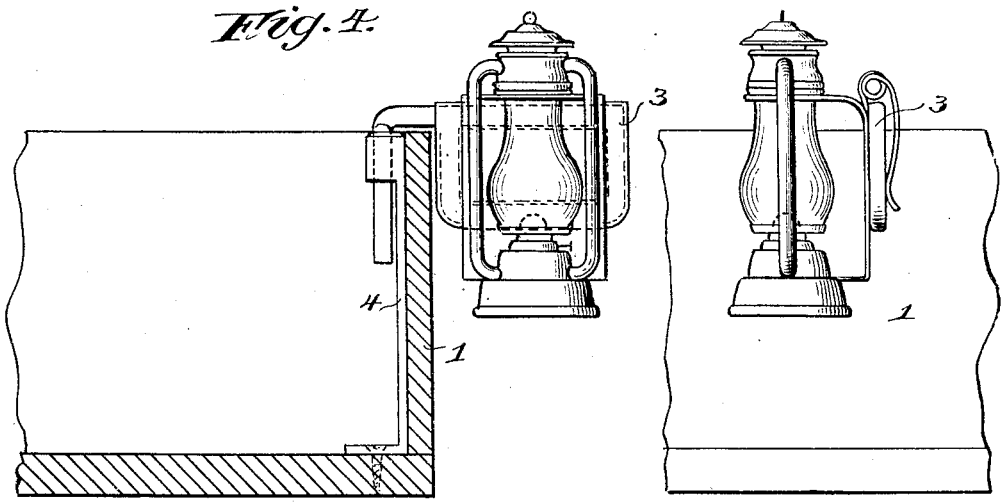
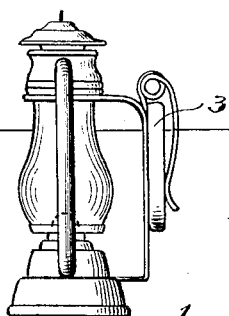
Witnesses,
Inventor,
Malcolm D. Lewis
By Offield Towle & Linthicum

UNITED STATES PATENT OFFICE.

MALCALM D. LEWIS, OF COLUMBIA, MISSOURI.

LANTERN-BRACKET.

No. 805,145.          Specification of Letters Patent.          Patented Nov. 21, 1905.

Application filed February 6, 1905. Serial No. 244,453.

*To all whom it may concern:*

Be it known that I, MALCALM D. LEWIS, a citizen of the United States, residing at Columbia, in the county of Boone and State of Missouri, have invented certain new and useful Improvements in Lantern-Brackets, of which the following is a specification.

This invention relates to lantern-brackets, and more particularly to a bracket adapted to be attached to the bed or box of a buggy, wagon, or other vehicle for the purpose of holding a lantern.

Among the salient objects of the invention are to provide a device of the character referred to by means of which a lantern or other light may be quickly and securely attached to the bed or box of a vehicle and at such location thereon as to hold the light in a most desirable and convenient position; to provide a two-piece bracket one piece of which is permanently attached to the box or bed, while the other may be disengaged at will or adjusted to such position that it will not be in the way, and, in general, to provide a bracket of the character referred to which is simple, inexpensive, and practicable.

The invention will be readily understood from the following description, reference being had to the accompanying drawings, in which—

Figure 1 is a view showing a portion of a wagon or buggy bed with the device attached thereto in position to receive the lantern. Fig. 2 is a perspective view of the socket member which is adapted to be attached to the vehicle. Fig. 3 is a similar view of the bracket-member frame. Fig. 4 is a sectional view of the vehicle-bed, showing a modified form of socket member with bracket member and lantern attached thereto at the upper edge of the bed or box; and Fig. 5 is a side or edge view of the device shown in Fig. 4.

In the drawings, 1 designates a portion of the bed or box of a wagon, buggy, or other vehicle to which the device is applied.

The invention comprises a socket member 2, as shown in Fig. 2, and secured to the bottom of the bed or box, as shown in Fig. 1, and a bracket member 3, comprising a frame, as shown in Fig. 3, covered with leather or other suitable covering, as shown in Fig. 1, said covering being similar to the usual dashboard-covering as applied to buggies and the like. This construction of bracket member can be padded, and thereby provide a more effective holding member for the spring-clasp on the lantern to be attached thereto. To this end the bracket member 3 is cut away in its middle portion to form a frame and to lighten the device.

In Fig. 4 a slightly-modified form of socket member is shown. In this construction an extension is provided between the base-plate and the socket portion, and the member is placed on the inside of the box or bed, the length of the extension (designated 4) being such that the socket portion comes near the upper edge of the box or bed, as clearly indicated in Fig. 4. The bracket member is applied thereto so as to project over the edge of the box or bed, as shown, and the lantern attached thereto in the manner indicated. The stem of the bracket member is preferably square or cornered, so as to fit snugly and rigidly, and is of such length as to insure it against being accidentally disengaged. If desired, the bracket member can be turned so as to project along the side of the bed or box in an out-of-the-way position, as will be obvious without special showing, or it can be removed with the lantern at will.

While I have shown and described what I deem a preferred embodiment of the invention, it is obvious that alterations and modifications can be made therein without departing from the spirit of the invention, and I do not, therefore, limit the invention to the details of construction and arrangement here shown and described except in so far as such details are made the subject-matter of specific claims.

I claim—

1. As a new article of manufacture, a lantern-bracket for vehicles, comprising a socket member adapted to be attached to the vehicle and a lantern-receiving bracket member comprising a flat, flag-like body portion provided at one side with a downwardly-projecting stem adapted to said socket member, said stem and said bracket member lying within substantially the same plane.

2. As a new article of manufacture, a bracket for lanterns or the like, comprising a socket member adapted to be secured to the bed or box of a vehicle, and a bracket member consisting of a rectangular frame provided at one side with a downwardly-projecting stem adapted to said socket and covered with leather or analogous material; substantially as described.

3. A lantern-bracket comprising a member provided with a cornered socket, a bracket member provided with a cornered stem adapted to said socket, said bracket member consisting of a metal frame covered with leather or analogous material and arranged to project in a vertical plane from said stem.

4. A bracket for lanterns and the like, comprising a member provided with a cornered receiving-socket and a base-plate for securing said member to the box or bed of a vehicle, a bracket member consisting of a rectangular frame provided at one side with a cornered stem projecting therefrom in the same plane and adapted to said socket, said frame member being padded and covered with leather or analogous material, substantially as and for the purpose described.

MALCALM D. LEWIS.

Witnesses:
L. J. SLATE,
A. G. SPENCER.